(12) United States Patent
Matama

(10) Patent No.: US 6,683,701 B1
(45) Date of Patent: Jan. 27, 2004

(54) IMAGE PROCESSING METHOD, INFORMATION MANAGEMENT DEVICE AND IMAGE PROCESSING DEVICE

(75) Inventor: Toru Matama, Kanagawa (JP)

(73) Assignee: Fuui Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/327,952

(22) Filed: Jun. 8, 1999

(30) Foreign Application Priority Data

Jun. 15, 1998 (JP) .......................................... 10-166982

(51) Int. Cl.7 .............................................. G06F 13/00
(52) U.S. Cl. ......................... 358/1.9; 358/506; 382/169
(58) Field of Search ........................ 358/1.9, 487, 506, 358/302, 507; 382/169; 396/311, 6, 208, 429, 310; 355/18, 40, 41

(56) References Cited

U.S. PATENT DOCUMENTS

| | | | | |
|---|---|---|---|---|
| 5,032,855 A | * | 7/1991 | Taniguchi et al. ............. | 354/21 |
| 5,093,731 A | * | 3/1992 | Watanabe et al. ........... | 348/232 |
| 5,420,699 A | * | 5/1995 | Yamanouchi et al. ....... | 358/487 |
| 5,432,580 A | * | 7/1995 | Tokuda ........................ | 396/570 |
| 5,455,648 A | * | 10/1995 | Kazami ....................... | 396/310 |
| 5,477,353 A | * | 12/1995 | Yamasaki ................... | 358/487 |
| 5,710,618 A | * | 1/1998 | McIntyre ..................... | 355/40 |
| 5,726,737 A | * | 3/1998 | Fredlund et al. ............... | 355/40 |
| 5,745,218 A | * | 4/1998 | Sugahara et al. ............. | 355/40 |
| 5,819,126 A | * | 10/1998 | Kitagawa et al. ........... | 396/319 |
| 5,963,752 A | * | 10/1999 | Zander ........................ | 396/388 |
| 6,047,140 A | * | 4/2000 | Yoshikawa ................... | 396/310 |
| 6,169,596 B1 | * | 1/2001 | Shiota .......................... | 355/40 |
| 6,222,607 B1 | * | 4/2001 | Szajewski et al. ............. | 355/27 |
| 6,272,287 B1 | * | 8/2001 | Cipolla et al. .................. | 396/6 |
| 6,272,293 B1 | * | 8/2001 | Matama ....................... | 396/208 |
| 6,289,134 B1 | * | 9/2001 | Kondo et al. ............... | 382/274 |
| 6,346,998 B2 | * | 2/2002 | Shiota et al. ............... | 358/487 |
| 6,366,366 B1 | * | 4/2002 | Nakamura ................... | 358/487 |
| 6,504,620 B1 | * | 1/2003 | Kinjo ........................ | 358/1.15 |

FOREIGN PATENT DOCUMENTS

| | | | | |
|---|---|---|---|---|
| JP | 2-191932 | | 7/1990 | |
| JP | 6-237376 A | | 8/1994 | |
| JP | 10-26813 | | 1/1998 | |
| JP | 6169596 | * | 1/2002 | ........... G03B/27/52 |

* cited by examiner

Primary Examiner—Mark Wallerson
(74) Attorney, Agent, or Firm—Birch, Stewart, Kolasch & Birch, LLP

(57) ABSTRACT

A finishing code is determined with precedence given to a finishing code recorded in an IC later rather than to a finishing code recorded in a bar code as an initial value. If the determined finishing code is a monochrome finishing code, image processing for attaining a monochrome finishing is performed, and if the determined finishing code is a sepia tone finishing code, image processing for attaining a sepia tone finishing is performed. Further, if the determined finishing code is a special finishing cancellation code or an ordinary finishing code, image processing for attaining an ordinary color finishing is performed. As a result, by only recording a desired finishing code in the IC, it is possible to obtain a photographic print corresponding to the desired finishing code instead of to the a finishing code recorded on the bar code during production.

17 Claims, 15 Drawing Sheets

F I G. 9
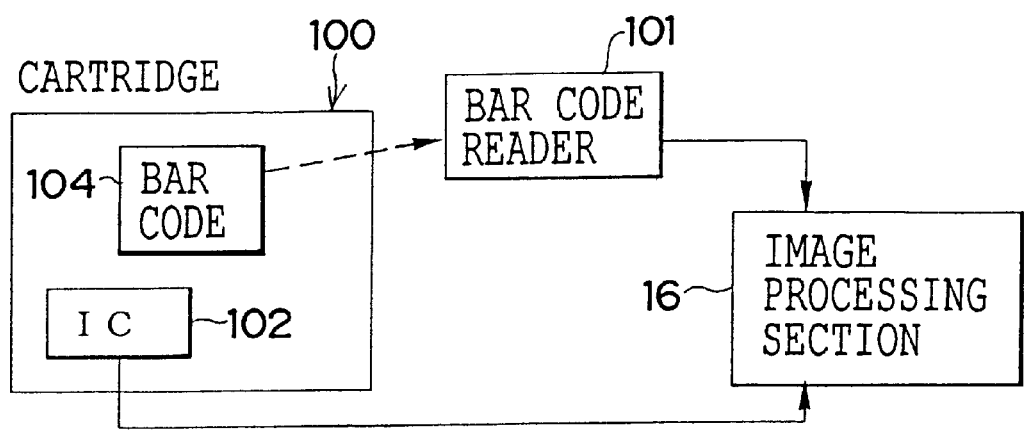

F I G. 13

| CONTENT OF FINISHING PROCESSING | FINISHING CODE |
|---|---|
| ORDINARY FINISHING (COLOR) | A01 |
| MONOCHROME FINISHING | A02 |
| SEPIA TONE FINISHING | A03 |
| SPECIAL PROCESSING CANCELLATION | A00 |

FIG. 14A

| BAR CODE INFORMATION | INFORMATION RECORDED IN IC |
|---|---|
| A03 | A02 |

==> A02 IS APPLIED

FIG. 14B

| BAR CODE INFORMATION | INFORMATION RECORDED IN IC |
|---|---|
| A03 | A00 |

==> A00 IS APPLIED
(SPECIAL PROCESSING CANCELLATION)

IMAGE PROCESSING METHOD, INFORMATION MANAGEMENT DEVICE AND IMAGE PROCESSING DEVICE

BACKGROUND OF THE INVENTION

1. Field of the Invention

The present invention relates to an image processing method, an information management device and an image processing device, and more particularly to an image processing method for reading an image recorded on a photographic photosensitive material and processing image data obtained by that reading, an information management device for recording information on a photographic photosensitive material, a cartridge, or a camera shipped with a photographic photosensitive material already loaded therein, and an image processing device for reading an image recorded on the photographic photosensitive material and processing the image data obtained by that reading.

2. Description of the Related Art

Conventionally, a camera (what is known as a lens-fitted film package) in which a photographic photosensitive material such as an unexposed photographic film (hereinafter referred to simply as photographic film) is loaded, has been well known, and currently, types in which a monochrome film or sepia film is loaded are on sale. However, in an era when the use of digital printers has become commonplace, various types of finished photographic prints can be created even from an ordinary color negative film by recording the finishing information on a bar code or the like and producing the finished photographic prints using a digital printer in accordance with the specified finishing information.

In such a lens-fitted film package, information on the photographic finishing method (finishing information) is recorded via a bar code or the like on the cartridge housing the film or on the film itself at the time of production. Upon printing each frame image recorded on a film, the above-mentioned finishing information is read and image processing corresponding to that processing information is performed on the image data of each frame image (image data obtained by reading the frame image), so that a photographic print of a printing finish corresponding to the above finishing information is produced.

Actually in most cases, a film accommodated in the lens-fitted film package is an ordinary color negative film, regardless of the above-mentioned finishing specifications. In other words, if the finishing information can be changed, a photographic print of the desired printing finish can be obtained from a frame image taken with the lens-fitted film package.

However, technology for changing information recorded in advance on the lens-fitted film package (finishing information or the like) to the desired information has not yet been established, so that it is difficult to change the print finishing method to the desired print finishing method in accordance with the desires of the purchaser of the lens-fitted film package at the time of development.

SUMMARY OF THE INVENTION

Accordingly, the present invention has been achieved to solve the above problem, and it is an object of the present invention to provide an information management device capable of changing finishing information or the like recorded in advance to desired information, an image processing method and an image processing device capable of performing image processing based on information obtained after the change.

To achieve the above object, according to a first aspect of the present invention, there is provided an image processing method in which first image processing information indicating the content of processing to be performed on image data obtained by reading an image recorded on a photographic photosensitive material is recorded in advance during the production of each on a photographic photosensitive material, a cartridge housing a photographic photosensitive material, or a camera which is shipped with a photographic photosensitive material already loaded therein, an image recorded on the photographic photosensitive material is read, said first image processing information is read when image processing is performed on the image data obtained from the reading and the processing content of the processing to be performed is determined, and the image processing of said image data is performed, said image processing method comprising the steps of: when the content of image processing to be performed is changed, overwriting the first image processing information with second image processing information indicating the content of image processing after the change or additionally recording the second image processing information; if the second image processing information is recorded on the photographic photosensitive material, the cartridge or the camera when the image processing on the image data is performed, reading the second image processing information; and determining the content of image processing to be performed on the basis of the second image processing information obtained by the reading.

According to a second aspect of the present invention, there is provided an image processing method according to the first aspect, wherein the first and second image processing information is lens type information relating to a lens mounted in the camera for projecting an object upon photographing and the content of the image processing includes at least one of aberration correction of the lens and peripheral darkening correction of the lens.

According to a third aspect of the present invention, there is provided an image processing method according to the first or second aspect, wherein the second image processing information includes cancellation instruction information for instructing the cancellation of a predetermined image processing.

According to a fourth aspect of the present invention, there is provided an information management device for overwriting the first image processing information with second image processing information indicating a processing content different from that of the first image processing information or for recording the second image processing information as an addition to the first image processing information, when the first image processing information and the second image processing information relate to a photographic photosensitive material, a cartridge for housing a photographic photosensitive material, or a camera shipped with a photographic photosensitive material already loaded therein on each of which the first image processing information indicating the content of the image processing to be performed on image data obtained by reading an image recorded on the photographic photosensitive material has been recorded in advance.

According to a fifth aspect of the present invention, there is provided an image processing device for performing image processing on image data obtained by reading an image recorded on photographic photosensitive material comprising: processing information reading means for reading the image processing information from a photographic photosensitive material, a cartridge for housing a photographic photosensitive material, or a camera shipped with a photographic photosensitive material already loaded therein on each of which the image processing information indicating the content of the image processing to be performed on the image data has been recorded in advance; and determining means for determining the content of the image processing to be performed on the basis of the image processing information obtained from the reading by the processing information reading means.

According to the image processing method of the first aspect, the first image processing information indicating the content of image processing to be performed on image data obtained by reading an image recorded on a photographic photosensitive material such as a photographic film (hereinafter referred to simply as photographic film), is recorded on a photographic film, a cartridge for housing the photographic film or a camera shipped with the photographic film already loaded therein (for example, a lens-fitted film package). When the image recorded on the photographic film is read and image processing is performed on the image data obtained by the reading, the first image processing information is read so as to determine the content of the image processing to be performed, and image processing is performed on the image data according to the content of the processing obtained by the determination.

As the image processing information, for example, aberration information of the lens for use for photographing or print finishing method information (i.e. information about sepia tone finishing or monochrome finishing or soft focus finishing) is available.

In this image processing method, if it is intended to change the content of the image processing to be performed, the first image processing information is overwritten with the second image processing information indicating the content of the image processing after the change or the second image processing information is recorded as an addition to the first image processing information. If the second image processing information is recorded on the photographic film, cartridge, or camera when image processing of the image data is performed, that second image processing information is read and the content of image processing to be performed is determined depending on not the first image processing information but the second image processing information obtained from the reading.

As a result, the second image processing information indicating the content of image processing after the change is taken in precedence to the first image processing information recorded in advance during production, so that the content of the image processing after the change is set as the content of the image processing to be performed. Next, the image processing is performed out on the image data according to the content of the image processing after the change. That is, the image processing can be performed out according to the content of the processing indicated by the second image processing information recorded after the first image processing information.

According to the second aspect of the present invention, at least one of lens aberration correction and peripheral darkening correction are performed on the image data using at least one of the lens aberration correction information and the peripheral darkening correction information for the lens type information after the change rather than for the lens type information recorded in advance during production (lens type information for a lens mounted in a camera for projecting an object when photographing). With precedence given to the lens type information recorded after, the image processing (at least one of aberration correction and peripheral darkening correction) can be performed according to at least one of the lens aberration correction information and peripheral darkening correction information corresponding to the lens type information recorded later.

The second image processing information may include cancellation instruction information for instructing the cancellation of a predetermined image processing as in the third aspect. If the second image processing information includes cancellation instruction information, the execution of a predetermined image processing is canceled according to the cancellation instruction information.

That is, by including the cancellation instruction information for instructing the cancellation of a particular image processing in the second image processing information, when a particular image processing is required to be canceled, the particular image processing can be canceled according to the cancellation instruction information.

In the information management device of the fourth aspect, the first image processing information is overwritten with the second image processing information indicating a processing content different from the first image processing information or the second image processing information is recorded as an addition to the first image processing information, with respect to a photographic film, a cartridge, or a camera on which the first image processing information indicating the content of the image processing to be performed has been recorded in advance.

Using this information management device, the first image processing information recorded in advance on the photographic film, cartridge, or camera can be overwritten with the second image processing information or the second image processing information can be recorded as an addition to the first image processing information.

In the image processing device of the fifth embodiment, the processing information reading means reads the image processing information from a photographic photosensitive material, the above-described cartridge, or the above-described camera on each of which the image processing information indicating the content of the image processing to be performed on the image data has been recorded at the time of production, or overwritten or recorded as an addition by the information management device of the forth aspect of the present invention. The determining means determines the content of the image processing indicated by the image processing information obtained from the reading as the content of the image processing to be performed. Then, image data obtained by reading an image recorded on the photographic film is processed according to the content of the image processing obtained by this determination.

That is, in this image processing device, the image data of an image recorded on the photographic film can be processed according to the content of a processing indicated by the image processing information recorded on the photographic film, cartridge, or camera.

BRIEF DESCRIPTION OF THE DRAWINGS

FIG. 9 is a diagram showing a flow of information from the cartridge to the image processing section.

FIG. 13 is a table showing an example of the corresponding relation between the content of the finishing processing and the finishing code.

FIG. 14A is a diagram explaining that IC information is given precedence to bar code information.

FIG. 14B is a diagram explaining a case where the cancellation of image processing is instructed.

DESCRIPTION OF THE PREFERRED EMBODIMENTS

Hereinafter, the embodiment of the present invention will be described with reference to the accompanying drawings.

Figure 1:
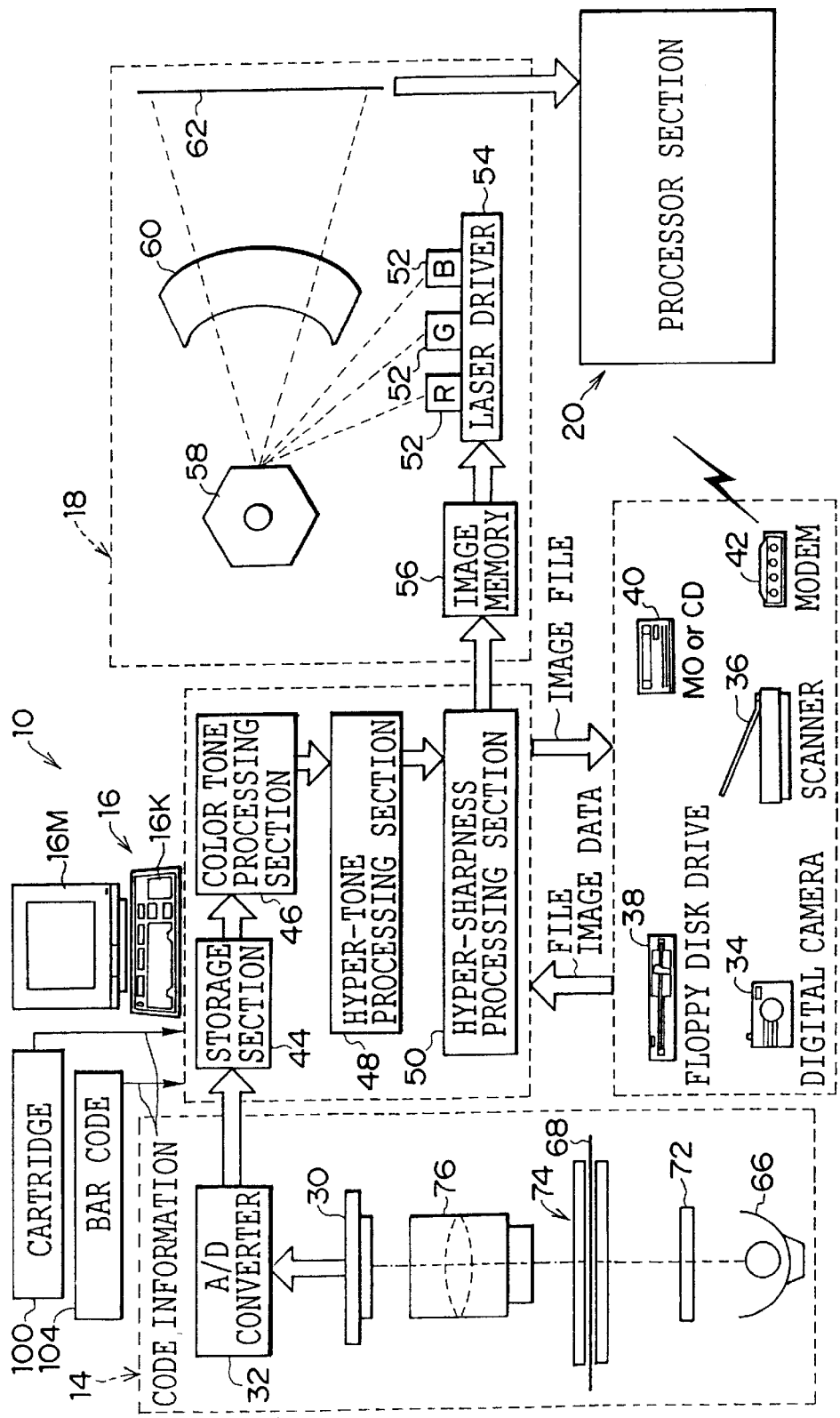
FIG. 1 is a schematic structure diagram of a digital laboratory system according to an embodiment of the present invention.
Figure 2:
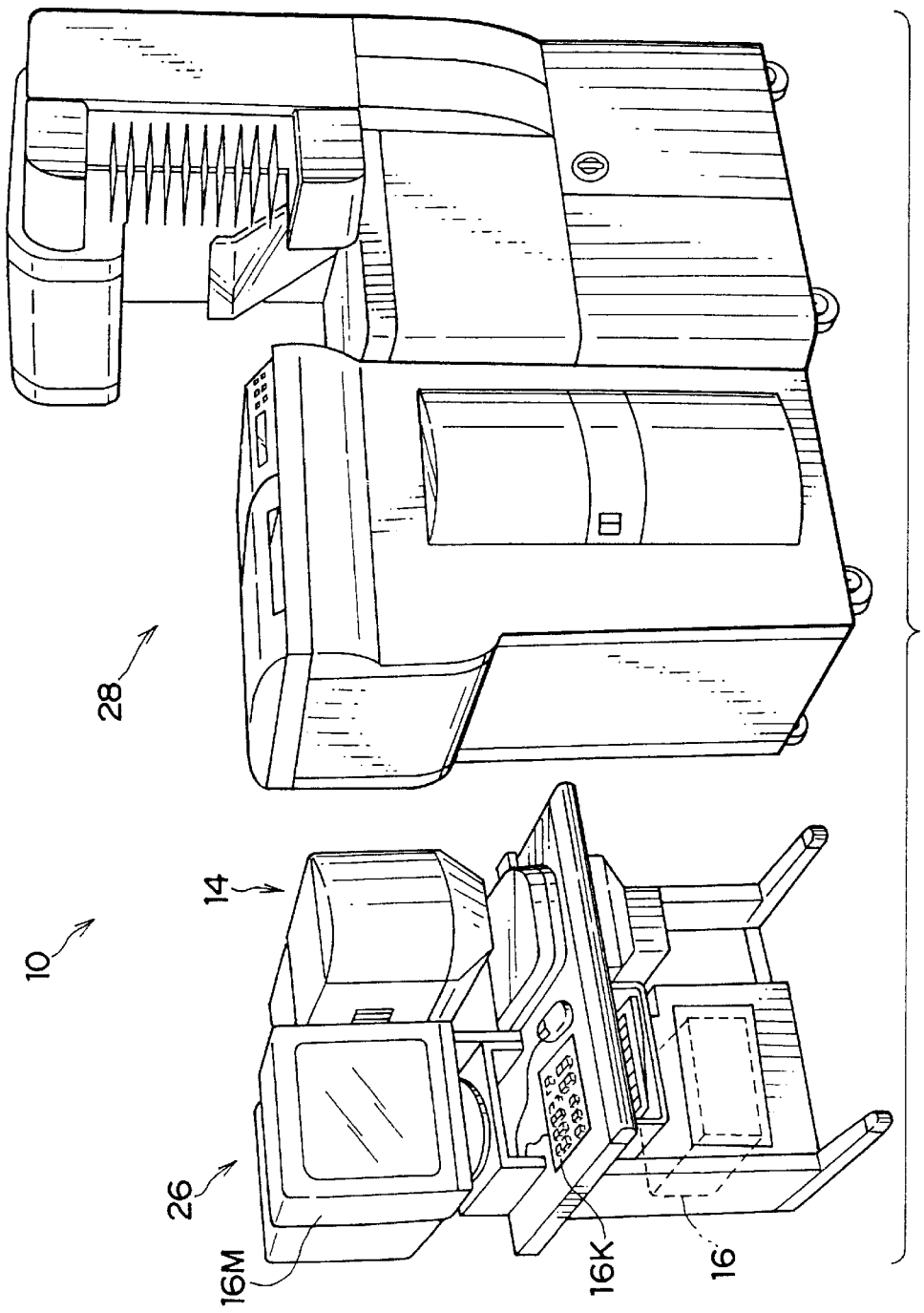
FIG. 2 is a view showing the exterior of the digital laboratory system.

FIGS. 1 and 2 show a schematic structure of a digital laboratory system 10 according to this embodiment.

As shown in FIG. 1, this digital laboratory system 10 includes a line CCD scanner 14, an image processing section 16, a laser printer section 18 and a processor section 20. The line CCD scanner 14 and the image processing section 16 are integrated as an input section 26 shown in FIG. 2 and the laser printer section 18 and the processor section 20 are integrated as an output section 28 shown in FIG. 2.

The line CCD scanner 14 reads a frame image recorded on a photographic film such as a negative film and a reversal film and is capable of reading a frame image on, for example, 135 size photographic film, 110 size photographic film, a photographic film having a transparent magnetic layer formed thereon (i.e. 240 size photographic film, also knowns as an APS film), and 120 size/220 size (brownie size) photographic film. In the line CCD scanner 14, light emitted from a light source 66 is diffused by a light diffusion plate 72 and irradiated on a frame image on a photographic film 68 placed on a film carrier 74. Light transmitted through the frame image strikes a lens unit 76 and the image from the aforementioned transmitted light is formed on a light receiving plane of the line CCD 30 by the lens unit 76. An image formed here is read by the line CCD 30, and the read image data is A/D converted by an A/D converter 32 and then outputted to an image processing section 16.

The image processing section 16 is constructed so as to be capable of receiving image data (scan image data) outputted from the line CCD scanner 14, image data obtained by photography using a digital camera 34 or the like, image data obtained by reading a document (e.g., reflective document) by means of a scanner 36 (flat bed type), image data produced using another computer and recorded on a floppy disk drive 38, MO drive, or CD drive 40, and communication image data received via a modem 42 from an external source (hereinafter these types of data are referred to as file image data). The image processing section 16 is constructed so as to be capable of receiving information recorded on a bar code 104 or cartridge 100, for example, information such as finish code, lens identification code and the like.

In the image processing section 16, inputted image data is stored in a storage section 44 composed of a nonvolatile storage device (e.g., hard disk device) and then subjected to image processing by a color gradation processing section 46, a hyper-tone processing section 48, a hyper-sharpness processing section 50, and the like. The recording processed image is outputted to a laser printer section 18. The image processing section 16 is also capable of externally outputting the processed image data in the form of an image file (for example, outputting the data to such a recording medium as FD, MO, CD or transmitting the data to another information processing device via a communication line).

The laser printer section 18 includes laser beam sources 52 for red, green and blue and controls a laser driver 54 so as to irradiate printing paper with laser beam modulated in accordance with the recording image data (temporarily stored in image memory 56) inputted from the image processing section 16. The image is recorded on the printing paper 62 by scan exposure (in the present embodiment, a polygon mirror 58, and an optical system mainly using fθ lens 60). The processor section 20 performs various processings such as development, bleaching fixing, washing and drying on the printing paper 62 on which the image is recorded by scan exposure by the laser printer section 18. As a result, the image is formed on the printing paper.

Figure 3:
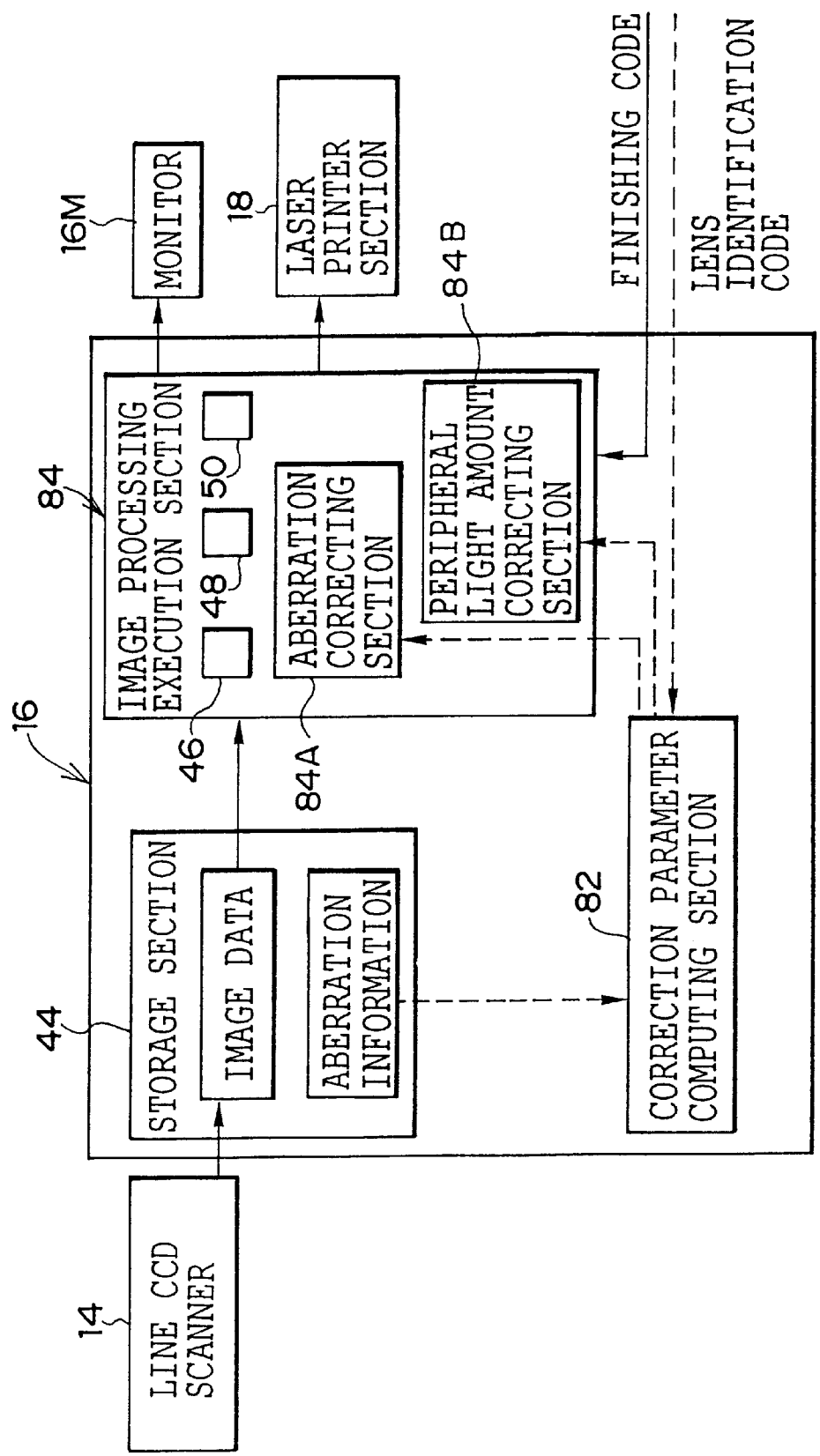
FIG. 3 is a block diagram showing a structure of an image processing section.

Next, the structure of the image processing section 16 will be described with reference to FIG. 3. As shown in FIG. 3, the image processing section 16 comprises a storage section 44 in which the aberration information of various lenses is stored correspondingly to the lens identification codes and in which inputted image data is also stored. The image processing section 16 further comprises an image processing performing section 84 including the aforementioned color gradation processing section 46, hyper-tone processing section 48 and hyper-sharpness processing section 50, for processing inputted image data so as to produce image data for output, and a correction parameter computing section 82 for fetching aberration information corresponding to the inputted lens identification code and computing correction parameters for correcting a deterioration in image quality (i.e. performing so-called aberration correction) caused by a lens aberration on the basis of the aberration information.

The image processing performing section 84 contains an aberration correcting section 84A for performing out aberration correction on image data according to correction parameters obtained by computation by the correction parameter computing section 82 and a peripheral light amount correcting section 84B for performing out peripheral light amount correction on image data according to correction parameters obtained by computation by the correction parameter computing section 82. The image processing performing section 84 receives finishing codes such as for finishing a print in a sepia tone, for finishing a print in monochrome, for soft focus finishing, for ordinary finishing (color printing), for canceling image processing, and the like (see FIG. 13) and the image data is subjected to image processing so as to obtain a finished print corresponding to the finishing code. In this embodiment, as the type of print finishing, color finishing is set as standard (default) and sepia finishing, monochrome finishing, and soft focus finishing are set as special finishing types.

Next, the structures of the lens-fitted film package and the cartridge loaded therein according to the present embodiment will be described.

Figure 4:
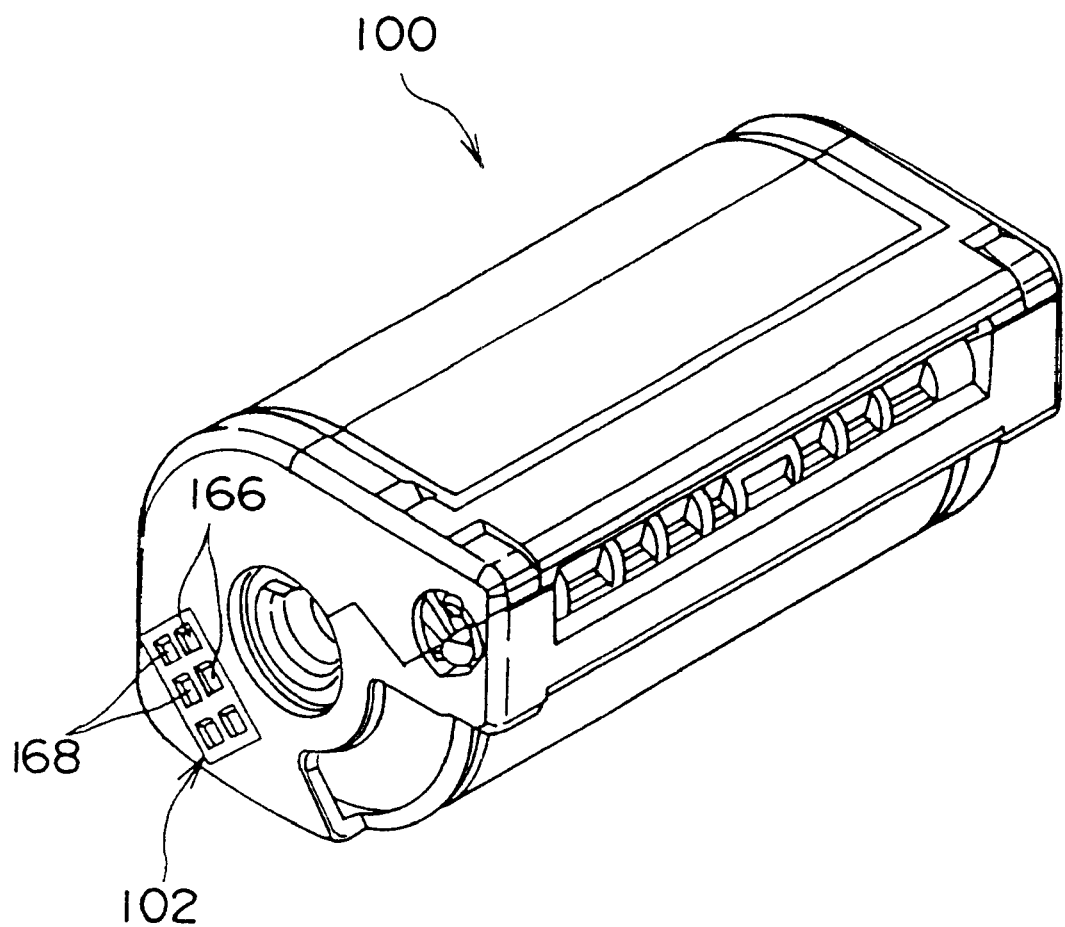
FIG. 4 is a perspective view of a cartridge.
Figure 5:
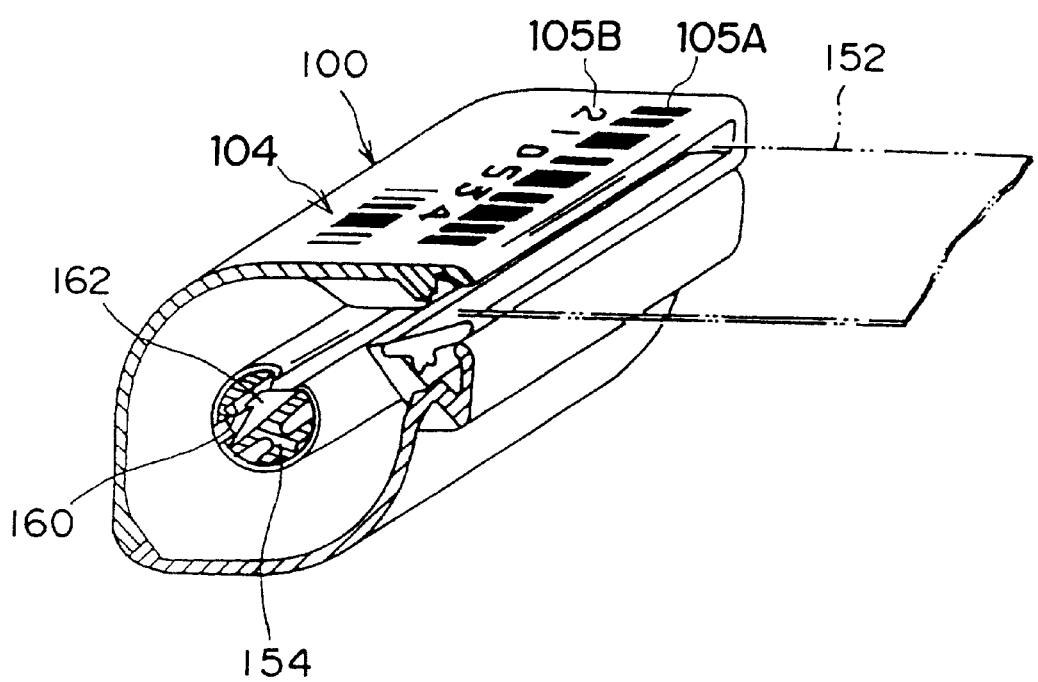
FIG. 5 is a perspective view with a partially cut away section showing an interior structure of the cartridge.

FIGS. 4 and 5 show an APS film cartridge 100 as the cartridge of the present embodiment. In this cartridge 100, a spool 154 for accommodating a negative film 152 wound in the form of a layer is disposed.

Figure 6:
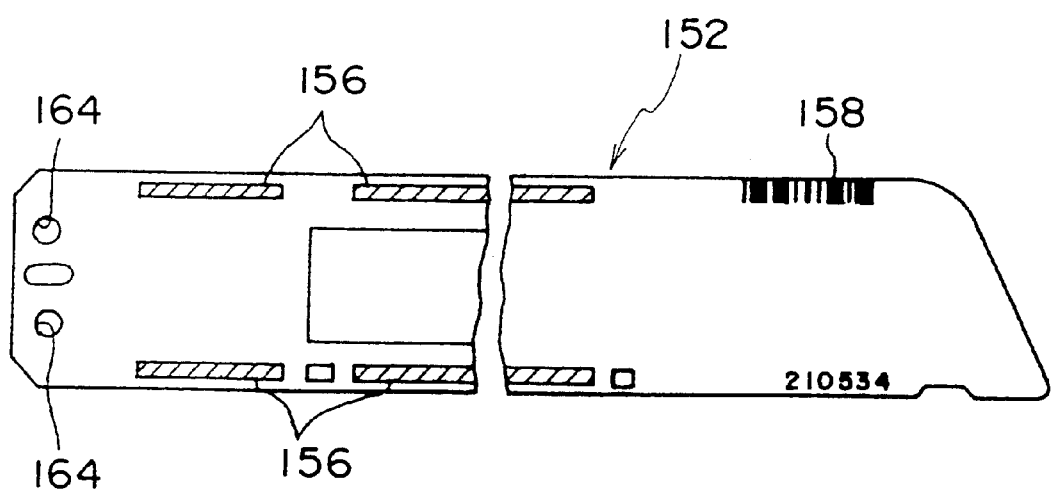
FIG. 6 is a plan view of a negative film.

As shown in FIG. 6, magnetic recording layers 156 are provided near both the ends in the transverse direction of a long negative film 152. On the negative film 152, optical information (bar code 158) indicating such information as the film identification number (film ID) is recorded.

As shown in FIG. 5, the spool 154 has a slit-like through hole 160 formed along the axial direction thereof and protruding pawls 162 are formed on an internal surface thereof. By engaging the protruding pawls 162 with holes 164 (see FIG. 6) of the negative film 152, the rear end section of the negative film 152 is connected to the spool 154 and is wound up in layers. Shaft ends of the spool 154 protrude out of the cartridge 100, and by rotating the shaft ends, the negative film 152 can be brought into or out of the cartridge 100.

A cartridge ID is recorded on an external surface of the cartridge 100 using a bar code 105 and numerals 105B. Ordinarily, this cartridge ID is equal to the aforementioned film ID.

The cartridge 100 of the present embodiment is loaded into the lens-fitted film package 110 (see FIG. 7) which will be described later and the lens-fitted film package 110 is shipped with the cartridge 100 loaded therein. In this lens-fitted film package 110, the lens for projecting an object at the time of photographing is fixed and ordinarily the lens is not replaced. That is, the lens-fitted film package 110 and its lens correspond to the cartridge 100. Therefore, to perform aberration correction (described later) in order to prevent a deterioration in image print quality due to lens aberration, a lens identification code for identifying that lens is recorded on the cartridge as described below. Further, it is determined whether the prints of the lens-fitted film package 110 will be finished in one of a sepia finish, monochrome finish, soft focus finish, or ordinary finish (color print) and the lens-fitted film package 110 is shipped as a product having predeterming print finishing specifications.

For this reason, the lens identification code for the lens of the lens-fitted film package 110 and the finishing code indicating information about the aforementioned print finishing are recorded on an external surface of the cartridge 100 by a bar code 104 at the time of production.

Figure 8:
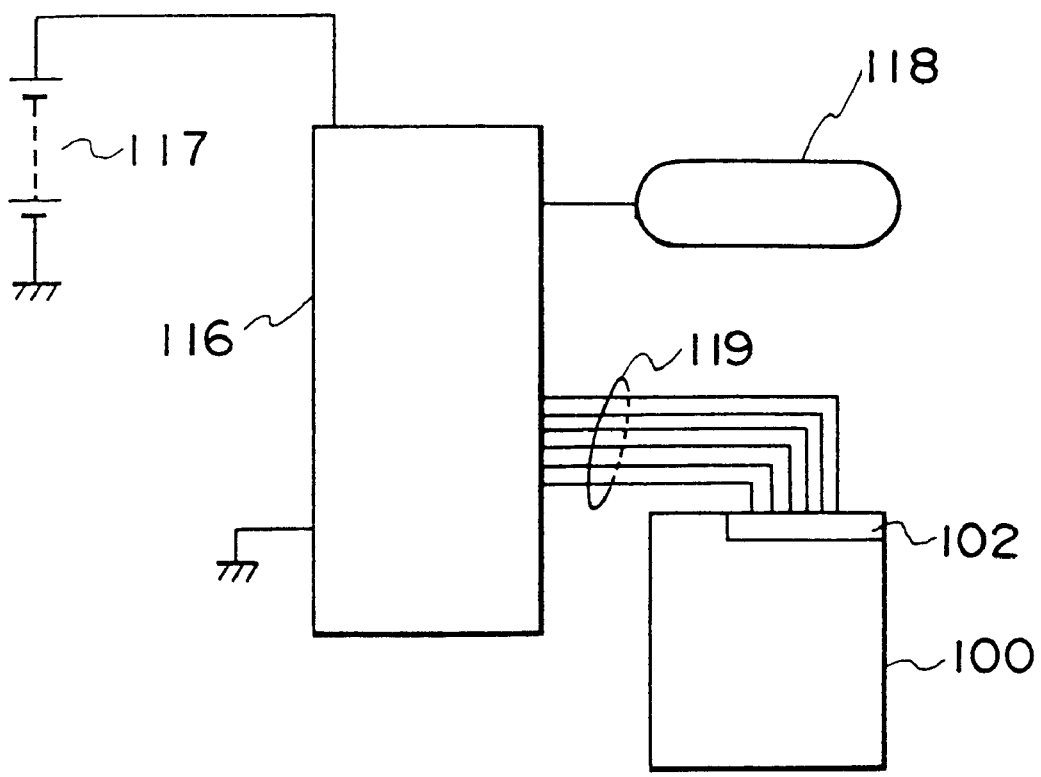
FIG. 8 is a control block diagram showing mainly an IC chip within the lens-fitted film package and a recording section for recording information in the IC chip.

As shown in FIG. 8, an IC chip 102 is buried in the cartridge 100 of the present embodiment as a recording medium to which information can be written. This IC chip 102 is provided with a plurality of terminals 166 (as an example, 6) and these terminals 166 are exposed through rectangular holes 168 provided on an end face of the cartridge 100 corresponding to each terminal 166.

The IC chip 102 is so constructed that new codes such as the aforementioned finishing code and lens identification code can be written or read by means of an information management device 126 which will be described later (see FIG. 10).

Figure 7:
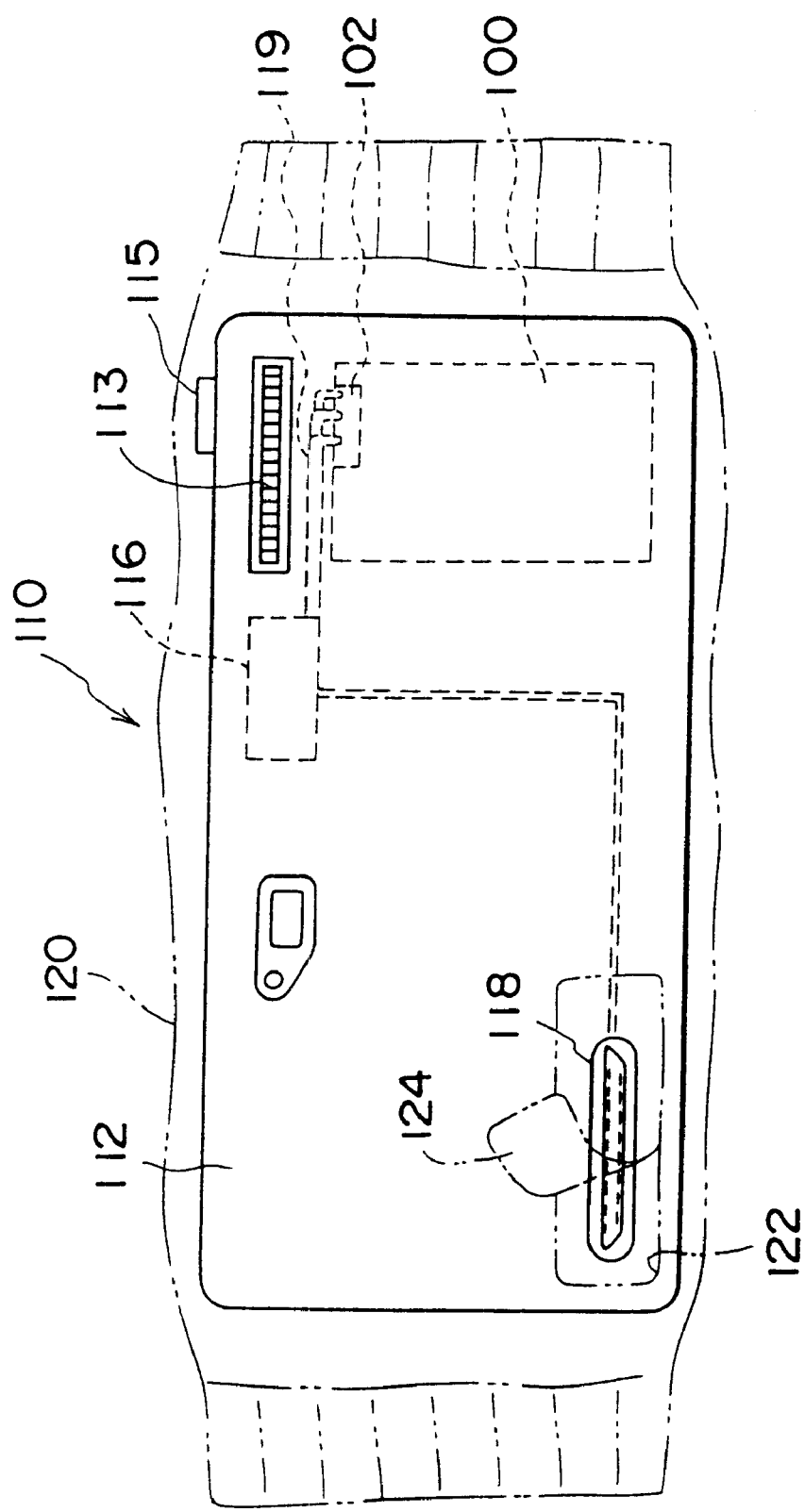
FIG. 7 is a rear view of a lens-fitted film package.

FIG. 7 shows a lens-fitted film package 110 in which the aforementioned cartridge 100 is loaded. Because the basic structure of this lens-fitted film package 110 is not different from the conventional one, a description of the film transportation system and the like is omitted. Generally, the cartridge 100 is loaded in an end section (right end section in the example of FIG. 7) of a case 112, and the negative film 152 (FIG. 5) is pulled out from the cartridge 100 and wound by a winding shaft (not shown) provided on the other end section. By rotating a dial 113 interlocking with a shaft of the cartridge 100, the negative film 152 is positioned at a photographing position for each frame and simultaneously each frame is accommodated in the cartridge 100 in succession. By pressing a release button 115, an image of an object is focused on the frame of the negative film 152 at the photographing position via a lens so that the image of the object is recorded in that frame (photographed).

An interface section 118 is provided on the back of the case 112 of the lens-fitted film package 110 and this interface section 118 is connected to an IC chip recording circuit 116 disposed inside the lens-fitted film package 110.

As shown in FIG. 8, the IC chip recording circuit 116 is supplied with electric power from a stroboscope power source 117 and pin-like movable terminals 119 (see FIG. 7) corresponding to each terminal of the IC chip 102 protrude from this IC chip recording circuit 116. Each movable terminal 119 is elastic so that its tip is bent substantially at a right angle. This tip is in contact with each terminal of the IC chip 102 of the cartridge 100 loaded in the case 112 and maintains a predetermined contact pressure with its elasticity.

SCSI, FireWire, USB, irDA, RS232C and the like may be employed in the interface section 118. This interface section 118 is provided on the back (on the opposite side to the lens facing the object to be photographed) of the lens-fitted film package 110. A small window 122 is provided in a package 120 for covering the lens-fitted film package 110 corresponding to this interface section 118.

A sealing member 124 is attached to this small window 122 and ordinarily, the small window 122 is closed by this sealing member 124.

Next, the structure of the information management device 126 for recording new code such as the aforementioned finishing code and lens identification code in the IC chip 102 of the cartridge 100 will be described with reference to FIGS. 10 and 11. This information management device 126 is installed in a processing laboratory for developing frame images recorded on the negative film within the cartridge 100. The information management device 126 may be installed at a factor producing the lens-fitted film packages 110 or at the counter of retailers of the lens-fitted film package 110. The case where the information management device 126 is installed at these places will be described later.

The information management device 126 comprises a micro computer 130, a key board 134 for inputting a desired code or the like, a monitor 136 for displaying information inputted through the key board 134, and an output interface 138. A connector 144 is attached to the output interface 138 via a lead wire 142 and this connector 144 can be connected to the interface section 118 of the lens-fitted film package 110. A code or the like inputted via the key board 134 in this connected state is transmitted to the interface section 118 of the lens-fitted film package 110 via the micro computer 130 and the output interface 138.

Thus, when an operator of the processing laboratory inputs a new code using the key board 134 with the connector 144 connected to the interface section 118, that inputted code is transmitted to the recording section 116 of the lens-fitted film package 110. This transmitted code is recorded in the IC chip 102 by the recording section 116.

Even if the lens-fitted film package 110 is loaded in the package 120 as shown in FIG. 7, the sealing member 124 is peeled off the small window 122 so as to expose the interface section 118 and the connector 144 is connected to the interface section 118, so that the new code can be recorded in the IC chip 102 in the same manner as above.

At the processing laboratory as shown in FIG. 9, the bar code 104 on the cartridge 100 is read by the bar code reader 101 and the read information (initial value of the aforementioned lens identification code and initial value of the finishing code) is inputted to the image processing section 16. Further, the interface section 118 is connected to the image processing section 16 via transmission cable so as to try to read information from the IC chip 102. If additional information such as new lens identification code and new finishing code are recorded in the IC chip 102, this additional information is inputted to the image processing section 16.

Next, the operation of the present embodiment will be described. Here, an example in which a new finishing code recorded in the IC chip 102 is read and then image processing based on a finishing method corresponding to that new finishing code is performed out will be described. In this case, a photographer takes a picture of an object using a lens-fitted film package 110 set in a sepia tone finishing state. A code "A03" indicating sepia tone finishing is recorded during production on the external surface of the cartridge 100 contained in this lens-fitted film package 110 in the form of a bar code 104.

After the photography is completed, the photographer brings the lens-fitted film package 110 to the processing laboratory and informs the operator of the processing laboratory that the photographer wants to change the sepia finishing to a monochrome finishing.

Figure 10:
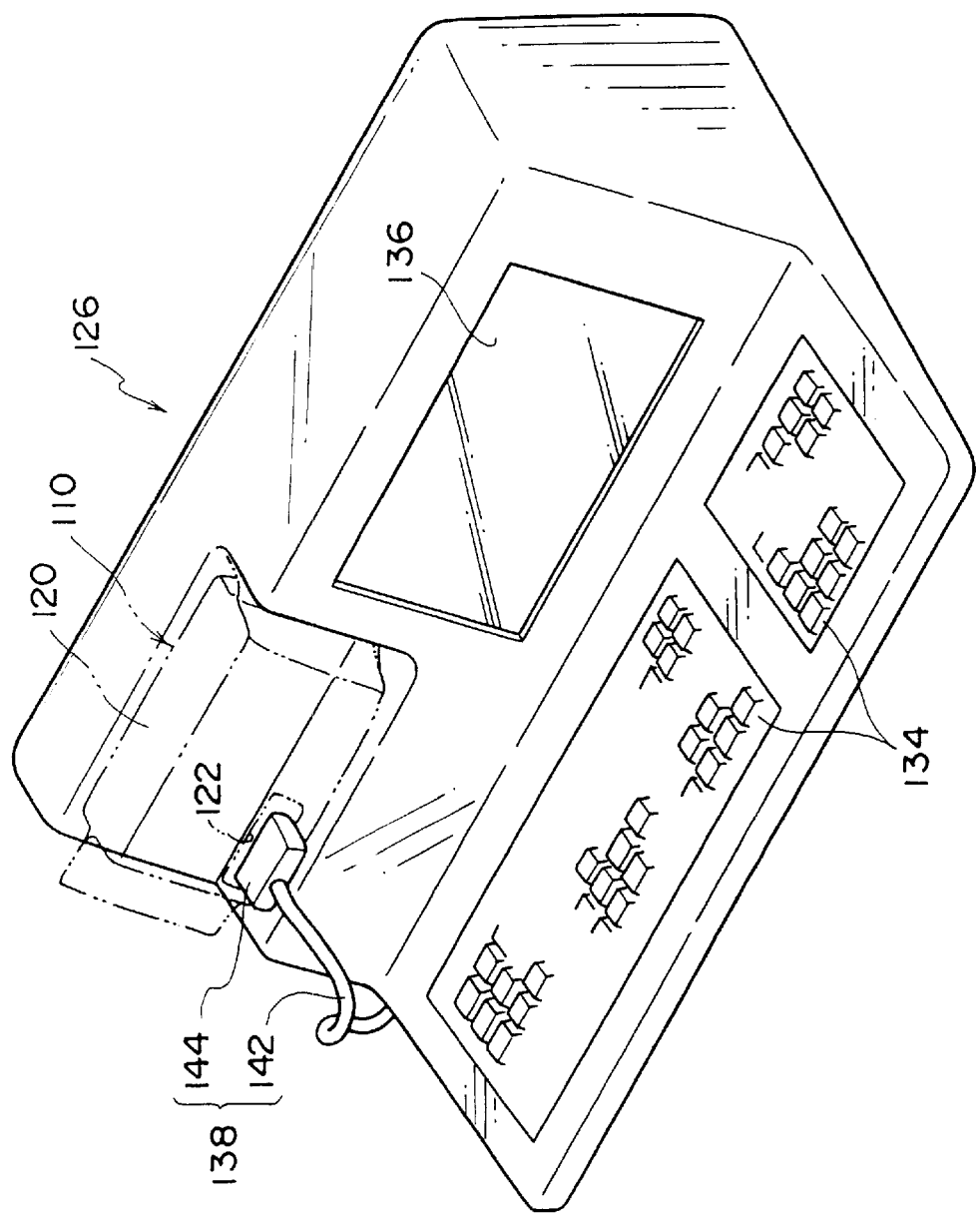
FIG. 10 is a perspective view showing the exterior of the information management device.
Figure 11:
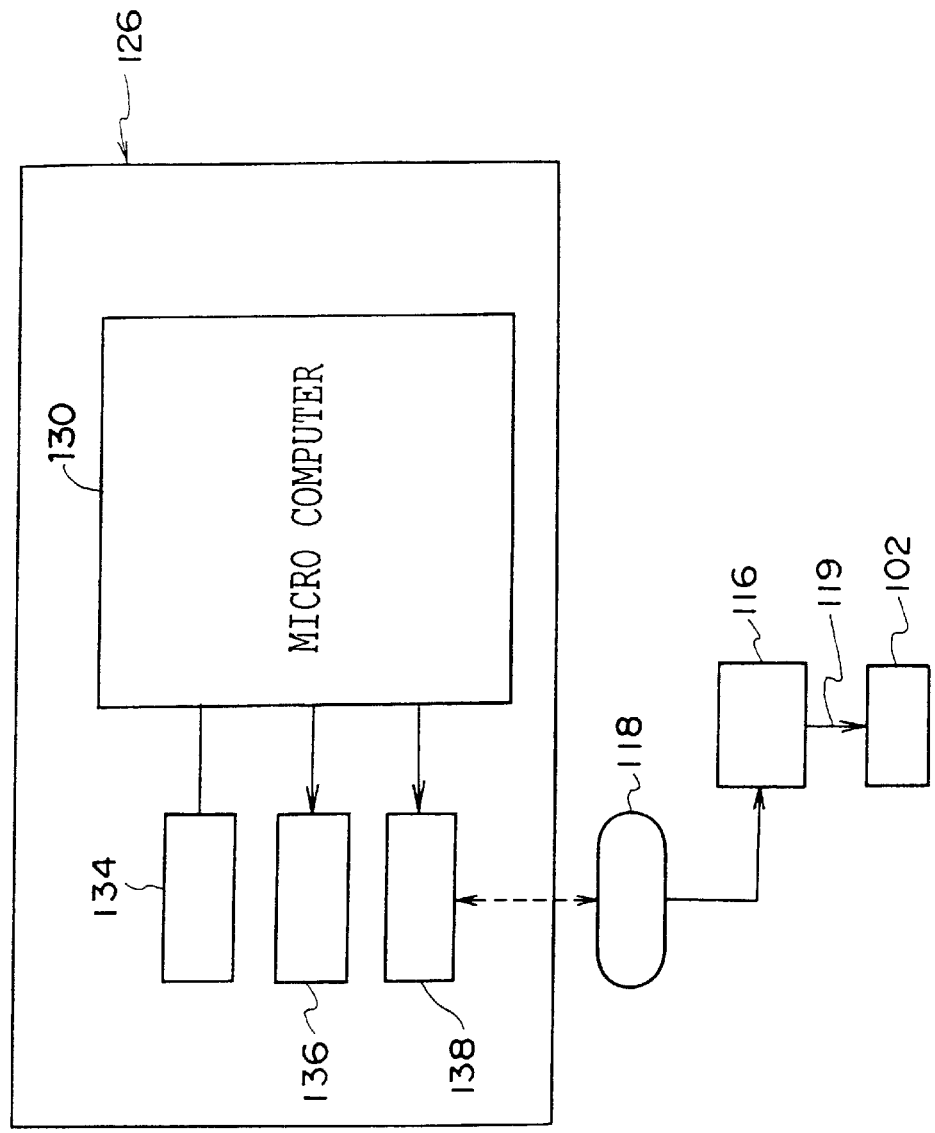
FIG. 11 is a control block diagram of the information management device.

The operator then places the lens-fitted film package 110 in a position indicated by the two dot chain line on the information management device 126 of FIG. 10 and with the connector 144 connected to the interface section 118, inputs "A02" as a new code indicating a monochrome finishing using the key board 134. Consequently, the inputted code "A02" is transmitted to the recording section 116 of the lens-fitted film package 110 and recorded on the IC chip 102 by the recording section 116. At this time, in the lens-fitted film package 110, a finish code "A03" is recorded on the bar code 104 and a finish code "A02" is recorded on the IC chip 102.

Next, the operator connects the interface section 118 to the image processing section 16 via a transmission cable and inputs the finishing code "A02" recorded in the IC chip 102 into the image processing section 16 by a predetermined operation. The operator then connects the bar code reader 101 to the image processing section 16 and by reading the finishing code "A03" recorded on the bar code 104 of the cartridge 100 by means of the bar code reader 101, inputs this finishing code "A03" into the image processing section 16 by a predetermined operation. Information inputted to the image processing section 16 (the finishing code "A02" recorded in the IC chip 102 and the finishing code "A03" recorded on the bar code) is recorded in the storage section 44.

Next, the operator disassembles the lens-fitted film package 110 and makes the line CCD scanner 14 read the negative film 152 contained in the cartridge 100. Consequently, the image data of each frame obtained by reading the frame images is inputted to the image processing section 16 and stored in the storage section 44.

Figure 12:
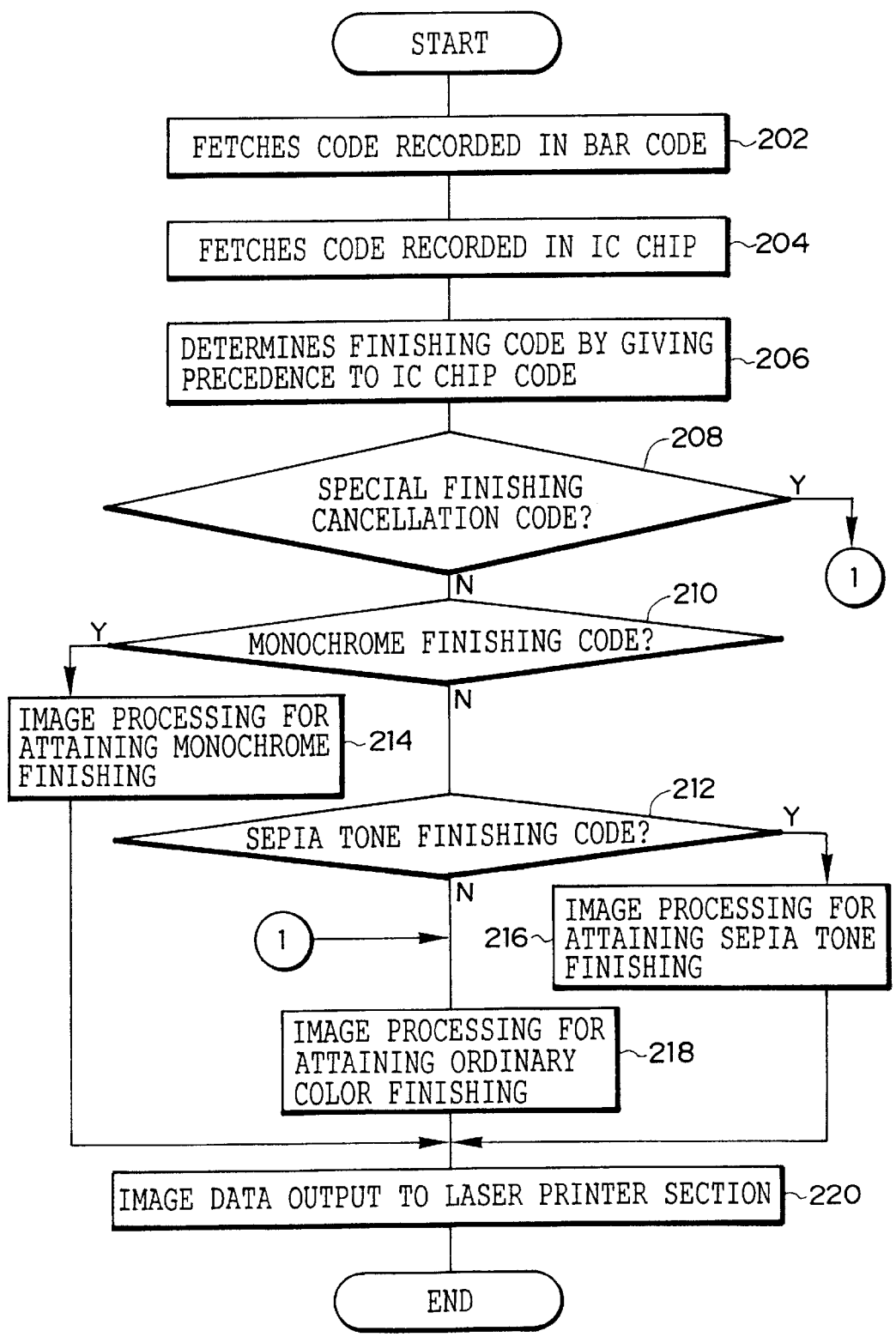
FIG. 12 is a flow chart showing a processing routine to be performed by an image processing execution section 84 of the present embodiment.

Next, the operator makes the image processing execution section 84 of the image processing section 16 perform the processing routine shown in FIG. 12 through a predetermined operation. The finishing code "A03" recorded in the bar code 104 is fetched from the storage section 44 at step 202 of FIG. 12 and at the next step 204, the finishing code "A02" recorded in the IC chip 102 is fetched from the storage section 44. At the next step 206, the finishing code is determined with the information of the IC chip 102 given precedence. That is, as shown in FIG. 14A, the information "A02" of the IC chip is determined as the finishing code.

At the next steps 208, 210, 212, whether or not a determined finishing code is a special finishing cancel code "A00", a monochrome finishing code "A02", or a sepia finishing code "A03" is determined. If the code determined here is "A02", the routine proceeds to step 214, in which image processing is performed so as to attain a monochrome finishing. If the determined finishing code is "A03", the routine proceeds to step 216, in which image processing is performed so as to attain a sepia tone finishing. If the determined finishing code is the special finishing cancel code "A00" or the ordinary finishing code "A01", the routine proceeds to step 218, in which image processing is performed so as to attain an ordinary color finishing.

Because in the above example, the finishing code is determined to be "A02", image processing is performed at step 214 so as to attain a monochrome finishing. If as shown in FIG. 14B, the cancel code "A00" is recorded in the IC chip 102 as a new finishing code, the finishing code is determined to be "A00" as described above. Consequently, each kind of special finishing (monochrome finishing, sepia tone finishing) is canceled and the processing proceeds to step 218, in which image routine is performed so as to attain an ordinary color finishing.

At step 220, the image data which has completed the image processing is outputted to the laser printer 18 and the processing is terminated. As a result, if image data subjected to image processing for a monochrome finishing is inputted to the laser printer section 18, a monochrome print is produced. If image data subjected to image processing for a sepia tone finishing is inputted, a sepia tone print is produced. If image data subjected to image processing for a color finishing is inputted, a color print is produced.

In this way, the finishing code is determined by giving precedence to the finishing code recorded in the IC chip 102 rather than to the finishing code recorded in the bar code 104 as the initial value and image processing corresponding to that determined finishing code (image processing for achieving a finished print corresponding to the finishing code) is performed. Next, image data produced by the image processing is outputted to the laser printer section 18. Therefore, a photographic print is produced corresponding to the finishing code recorded later at the laser printer section 18. As a result, the photographer can obtain a desired monochrome finished photographic print.

According to the present embodiment, simply by additionally recording a desired finishing code in the IC chip 102 of the cartridge 100 using the information management device 126 at the processing laboratory, it is possible to obtain a photographic print corresponding to the desired finishing code instead of the finishing code recorded during production.

Further, by additionally recording the finishing code "A00", it is possible to cancel various special finishings and apply the default specification (ordinary color finishing).

Recording of the code on the IC chip 102 can be performed out not only once but a plurality of times and the finally recorded code is read from the IC chip 102. That is, the finally recorded code is given the greatest precedence.

The finishing codes shown in FIG. 13 are only examples, and additionally, a code for producing a soft focus print or a code for obtaining monochrome and soft focus images may be provided.

The information management device 126 may be installed at a factory for producing the lens-fitted film package 110. For example, if the lens-fitted film packages specified for monochrome finishing are over-supplied and the lens-fitted film packages specified for sepia tone finishing become in short supply so that the stock quantities are unbalanced, by additionally recording the sepia tone finishing code "A03" in the IC chip of a cartridge contained in the lens-fitted film package specified for monochrome finishing, the lens-fitted film package specified for monochrome finishing can be changed to the lens-fitted film package specified for sepia tone finishing. Namely, the stocks of the lens-fitted film packages can be adjusted easily so that the amount of the lens-fitted film package specified for monochrome finishing held in stock is almost equal to the amount of the lens-fitted film package specified for sepia tone finishing held in stock.

Further, the information management device 126 may be installed on the counter of the retailer shop of the lens-fitted film package so that the sales clerks may record additional finishing codes in response to the wishes of the customer. In this case, the clerk peels off the sealing member 124 from the lens-fitted film package 110 accommodated in the package 120 shown in FIG. 7 so as to expose the interface section 118 through the small window 122 and then connect the connector 144 to the interface section 118. Then, a finishing code in accordance with the wishes of a customer may be additionally recorded in the IC chip 102.

Although in the above example, the new finishing code is given precedence over the initial value of a finishing code recorded in the bar code 104 by recording the new finishing code in the IC chip 102, the lens identification code of the lens-fitted film package 110 may be applied as follows instead of the finishing code.

Figure 15:
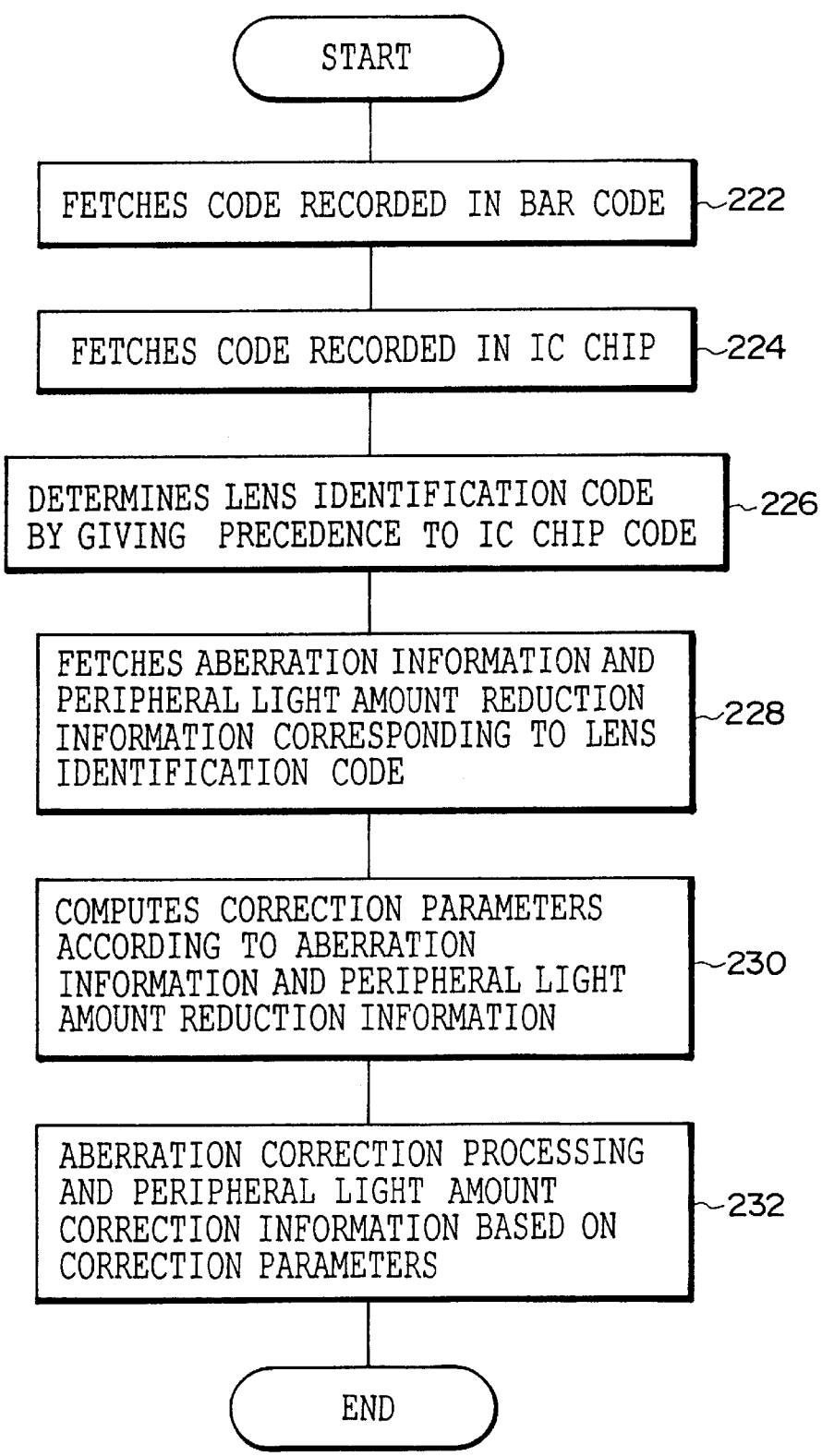
FIG. 15 is a flow chart showing a processing routine in a case in which a lens identification code is applied instead of a finishing code.

FIG. 15 shows a processing routine of the application example. At step 222 of FIG. 15, the initial value of the lens identification code recorded in the bar code 104 is fetched and then at the next step 224, a new lens identification code recorded in the IC chip 102 is fetched. At step 226, by giving precedence to the new lens identification code recorded in the IC chip 102 rather than to the initial value of the lens identification code, a lens identification code is determined.

The correction parameter computing section 82 of FIG. 3 fetches aberration information and peripheral light amount reduction information corresponding to the above determined lens identification code from the storage section 44 (step 228) and computes correction parameters for use in aberration correction processing and peripheral light amount correction for correcting deterioration of picture quality (picture distortion, color blur, darkening of a peripheral section, etc.) due to the aberration and peripheral light amount reduction (step 230). Next, the aberration correcting section 84A fetches correction parameters from the correction parameter computing section 82 and performs out aberration correction processing on the image data according to the correction parameters. The peripheral light amount correcting section 84B fetches the correction parameters from the correction parameter computing section 82 and performs out peripheral light amount correction processing on the image data according to the correction parameters (step 232).

If a lens of the lens-fitted film package 110 is replaced with another type for some reason, by recording a lens identification code after the replacement in the IC chip 102, the lens identification code after that replacement is determined to be a lens identification code with precedence over the initial value of the lens identification code. Then, by fetching aberration information and peripheral light amount reduction information corresponding to the determined lens identification code after the replacement, the aberration correction processing and peripheral light amount correction processing for correcting a deterioration picture quality due to the aberration and peripheral light amount reduction can be performed out.

Further, it is permissible to provide the cancellation lens identification code for canceling the execution of the aberration correction processing and peripheral light amount correcting processing. Consequently, as in the above embodiment, by additionally recording the cancellation lens identification code, the execution of the aberration correction processing and peripheral light amount correction processing can be canceled.

Assume that by applying this, an identification code particular to the cartridge 100 loaded on the lens-fitted film package 110, for example, is preliminarily recorded in the IC chip 102 of the cartridge 100. Then, by providing a code for canceling the above particular identification code and additionally recording this in the IC chip 102, it is possible to cancel the above particular identification code and ship the cartridge alone (without the cartridge being loaded on the lens-fitted film package 110).

Such initial value information as the initial value of the finishing code, initial value of the lens identification code and the like may be stored not only in an optical storage means but also in an electrical storage means like an IC chip. If the initial value information is stored in an electrical storage means like an IC chip, the initial value information may be overwritten with new information (the desired finishing code, lens identification code, and the like). Further, the new information (the desired finishing code, lens identification code, and the like) may be stored in an optical storage means such as a bar code.

Although in the above described case, information such as finishing codes and lens identification codes is stored in the cartridge 100, it is permissible to store the above information in the film 152 accommodated in the cartridge 100. For example, information may be stored in the magnetic recording layer 156 of the film 152 of FIG. 6, or by newly adding a bar code indicating information at a predetermined position of the film 152, or by making a plurality of holes indicating information at a predetermined place on the film 152.

Further, the above information may be recorded in the lens-fitted film package 110 by attaching a bar code seal indicating information on a case 112 of the lens-fitted film package 110.

When storing information in the magnetic recording layer of the film 152 of FIG. 6, different information for each frame may be recorded. If it is desired that the print finishing method be changed only for particular frames, this requirement is achieved by recording a desired finishing code in the magnetic recording layer 156 corresponding to the specified frames. As a result, only the specified frames are finished in accordance with the desired finishing code and the other frames are finished in accordance with the initial value of the finishing code.

What is claimed is:

1. An image processing method in which first image processing information indicating the content of processing to be performed on image data obtained by reading an image recorded on a photographic photosensitive material is recorded on a photographic photosensitive material, a cartridge housing a photographic photosensitive material, or a camera which is shipped with a photographic photosensitive material already loaded therein, an image recorded on the photographic photosensitive material is read, said first image processing information is read when image processing is performed on the image data obtained from the reading and the processing content of the processing to be performed is determined, and the image processing of said image data is performed, said image processing method comprising the steps of:

when the content of image processing to be performed is changed, overwriting said first image processing information with second image processing information indicating the content of image processing after the change or additionally recording said second image processing information;

if said second image processing information is recorded on the photographic photosensitive material, said cartridge, or said camera when the image processing on said image data is performed, reading said second image processing information; and determining the content of image processing to be performed on the basis of the second image processing information obtained by the reading, wherein said first image processing information is recorded on said photographic photosensitive material, said cartridge, or said camera in advance during production of said photographic photosensitive material, said cartridge, or said camera.

2. An image processing method according to claim 1 wherein said first and second image processing information is lens type information of a lens mounted in said camera for projecting an object during photography and the content of said image processing includes at least one of aberration correction of said lens and peripheral darkening correction of said lens.

3. An image processing method according to claim 1, wherein said second image processing information is recorded in an integrated circuit of said cartridge.

4. An image processing method in which first image processing information indicating the content of processing to be performed on image data obtained by reading an image recorded on a photographic photosensitive material is recorded in advance during the production of each on a photographic photosensitive material, a cartridge housing a photographic photosensitive material, or a camera which is shipped with a photographic photosensitive material already loaded therein, an image recorded on the photographic photosensitive material is read, said first image processing information is read when image processing is performed on the image data obtained from the reading and the processing content of the processing to be performed is determined, and the image processing of said image data is performed, said image processing method comprising the steps of:

when the content of image processing to be performed is changed, overwriting said first image processing information with second image processing information indicating the content of image processing after the change or additionally recording said second image processing information;

if said second image processing information is recorded on the photographic photosensitive material, said cartridge, or said camera when the image processing on said image data is performed, reading said second image processing information; and determining the content of image processing to be performed on the basis of the second image processing information obtained by the reading, wherein said first and second image processing information is print finishing method information for said photographic photosensitive material and the content of said image processing includes at least one of sepia tone finishing and monochrome finishing and soft focus finishing as special finishing, and ordinary finishing.

5. An image processing method according to claim 4 wherein said second image processing information includes cancellation instruction information for instructing the cancellation of a predetermined image processing.

6. An image processing method in which first image processing information indicating the content of processing to be performed on image data obtained by reading an image recorded on a photographic photosensitive material is recorded in advance during the production of each on a photographic photosensitive material, a cartridge housing a photographic photosensitive material, or a camera which is shipped with a photographic photosensitive material already loaded therein, an image recorded on the photographic photosensitive material is read, said first image processing information is read when image processing is performed on the image data obtained from the reading and the processing content of the processing to be performed is determined, and the image processing of said image data is performed, said image processing method comprising the steps of:

when the content of image processing to be performed is changed, overwriting said first image processing information with second image processing information indicating the content of image processing after the change or additionally recording said second image processing information;

if said second image processing information is recorded on the photographic photosensitive material, said cartridge, or said camera when the image processing on said image data is performed, reading said second image processing information; and determining the content of image processing to be performed on the basis of the second image processing information obtained by the reading, wherein said second image processing information includes cancellation instruction information for instructing the cancellation of a predetermined image processing.

7. An image processing method in which first image processing information indicating the content of processing to be performed on image data obtained by reading an image recorded on a photographic photosensitive material is recorded in advance during the production of each on a photographic photosensitive material, a cartridge housing a photographic photosensitive material, or a camera which is shipped with a photographic photosensitive material already loaded therein, an image recorded on the photographic photosensitive material is read, said first image processing information is read when image processing is performed on the image data obtained from the reading and the processing content of the processing to be performed is determined, and the image processing of said image data is performed, said image processing method comprising the steps of:

when the content of image processing to be performed is changed, overwriting said first image processing information with second image processing information indicating the content of image processing after the change or additionally recording said second image processing information;

if said second image processing information is recorded on the photographic photosensitive material, said cartridge, or said camera when the image processing on said image data is performed, reading said second image processing information; and determining the content of image processing to be performed on the basis of the second image processing information obtained by the reading, wherein said first and second image processing information is lens type information of a lens mounted in said camera for projecting an object during photography and the content of said image processing includes at least one of aberration correction of said lens and peripheral darkening correction of said lens, wherein said second image processing information includes cancellation instruction information for instructing the cancellation of a predetermined image processing.

8. An information management device for overwriting first image processing information with second image processing information indicating a processing content different from that of the first image processing information or for recording the second image processing information as an addition to the first image processing information, wherein said first image processing information and said second image processing information relate to a photographic photosensitive material, a cartridge for housing a photographic photosensitive material, or a camera shipped with a photographic photosensitive material already loaded therein, said first image processing information indicates the content of the image processing to be performed on image data obtained by reading an image recorded on said photographic photosensitive material, and wherein said first image processing information is recorded on said photographic photosensitive material, said cartridge, or said camera in advance during production of said photographic photosensitive material, said cartridge, or said camera.

9. An information management device according to claim 8 wherein said first and second image processing information is lens type information of a lens mounted in said camera for projecting an object during photography and the content of said image processing includes at least one of aberration correction of said lens and peripheral darkening correction of said lens.

10. An information management device according to claim 8, wherein said information management device records said second image processing information in an integrated circuit of said cartridge.

11. An information management device for overwriting first image processing information with second image processing information indicating a processing content different from that of the first image processing information or for recording the second image processing information as an addition to the first image processing information, when said first image processing information and said second image processing information relate to a photographic photosensitive material, a cartridge for housing a photographic photosensitive material, or a camera shipped with a photographic photosensitive material already loaded therein on each of which said first image processing information indicating the content of the image processing to be performed on image data obtained by reading an image recorded on said photographic photosensitive material has been recorded in advance, wherein said first and second image processing information is print finishing method information for said photographic photosensitive material and the content of said image processing includes at least one of sepia tone finishing and monochrome finishing and soft focus finishing as special finishing, and ordinary finishing.

12. An information management device according to claim 11 wherein said second image processing information includes cancellation instruction information for instructing the cancellation of a predetermined image processing.

13. An information management device for overwriting first image processing information with second image processing information indicating a processing content different from that of the first image processing information or for recording the second image processing information as an addition to the first image processing information, when said first image processing information and said second image processing information relate to a photographic photosensitive material, a cartridge for housing a photographic photosensitive material, or a camera shipped with a photographic photosensitive material already loaded therein on each of which said first image processing information indicating the content of the image processing to be performed on image data obtained by reading an image recorded on said photographic photosensitive material has been recorded in advance, wherein said second image processing information includes cancellation instruction information for instructing the cancellation of a predetermined image processing.

14. An information management device for overwriting first image processing information with second image processing information indicating a processing content different from that of the first image processing information or for recording the second image processing information as an addition to the first image processing information, when said first image processing information and said second image processing information relate to a photographic photosensitive material, a cartridge for housing a photographic photosensitive material, or a camera shipped with a photographic photosensitive material already loaded therein on each of which said first image processing information indicating the content of the image processing to be performed on image data obtained by reading an image recorded on said photographic photosensitive material has been recorded in advance, wherein said first and second image processing information is lens type information of a lens mounted in said camera for projecting an object during photography and the content of said image processing includes at least one of aberration correction of said lens and peripheral darkening correction of said lens, wherein said second image processing information includes cancellation instruction information for instructing the cancellation of a predetermined image processing.

15. An image processing device for performing image processing on image data obtained by reading an image recorded on photographic photosensitive material comprising:

processing information reading means for reading the image processing information from a photographic photosensitive material, a cartridge for housing a photographic photosensitive material, or a camera shipped with a photographic photosensitive material already loaded therein, the image processing information indicating the content of said image processing to be performed on said image data, said image processing information having been recorded on said photographic photosensitive material, said cartridge, or said camera in advance during production of said photographic photosensitive material, said cartridge, or said camera; and determining means for determining the content of the image processing to be performed in a case when said image processing information is replaced with new image processing information or when new image processing information is additionally recorded, on the basis of said new image processing information obtained from the reading by said processing information reading means.

16. An image processing device according to claim 15 wherein said image processing information is lens type information on a lens mounted in said camera for projecting an object during photography and the content of said image processing includes at least one of aberration correction of said lens and peripheral darkening correction of said lens.

17. An image processing device for performing image processing on image data obtained by reading an image recorded on photographic photosensitive material comprising:

processing information reading means for reading the image processing information from a photographic photosensitive material, a cartridge for housing a photographic photosensitive material, or a camera shipped with a photographic photosensitive material already loaded therein on each of which the image processing information indicating the content of said image processing to be performed on said image data has been recorded in advance, said image processing information having been recorded on said photographic photosensitive material, said cartridge, or said camera in advance during production of said photographic photosensitive material, said cartridge, or said camera; and determining means for determining the content of the image processing to be performed in a case when said image processing information is replaced with new image processing information or when new image processing information is additionally recorded, on the basis of said new image processing information obtained from the reading by said processing information reading means, wherein said image processing information is print finishing method information for said photographic photosensitive material and the content of said image processing includes at least one of sepia tone finishing and monochrome finishing and soft focus finishing as special finishing, and ordinary finishing.

* * * * *